(12) United States Patent
Dangi et al.

(10) Patent No.: US 12,399,790 B2
(45) Date of Patent: *Aug. 26, 2025

(54) RETENTION LOCK LEVERAGING IN A BACKUP COMPUTING SYSTEM

(71) Applicant: Dell Products L.P., Round Rock, TX (US)

(72) Inventors: Salil Dangi, Mission Viejo, CA (US); Amol Powar, Burlington (CA)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,765

(22) Filed: Jun. 7, 2024

(65) Prior Publication Data
US 2024/0330128 A1 Oct. 3, 2024

Related U.S. Application Data

(63) Continuation of application No. 18/159,168, filed on Jan. 25, 2023, now Pat. No. 12,032,456.

(51) Int. Cl.
*G06F 16/17* (2019.01)
*G06F 11/14* (2006.01)

(52) U.S. Cl.
CPC .................. *G06F 11/1469* (2013.01)

(58) Field of Classification Search
None
See application file for complete search history.

(56) References Cited

U.S. PATENT DOCUMENTS

| | | | |
|---|---|---|---|
| 5,202,982 A * | 4/1993 | Gramlich | G06F 16/164 |
| 5,893,140 A * | 4/1999 | Vahalia | G06F 16/1774 |
| 11,341,245 B1 | 5/2022 | Voss et al. | |
| 12,032,456 B1 | 7/2024 | Dangi et al. | |
| 2009/0240739 A1* | 9/2009 | Bhatt | G06F 16/2343 |
| 2013/0066835 A1* | 3/2013 | Haubold | G06F 16/1774 707/640 |
| 2021/0149768 A1* | 5/2021 | Moon | G06F 16/16 |
| 2022/0083514 A1 | 3/2022 | Rath et al. | |
| 2022/0114062 A1 | 4/2022 | Madan et al. | |

* cited by examiner

*Primary Examiner* — Son T Hoang
(74) *Attorney, Agent, or Firm* — Workman Nydegger

(57) ABSTRACT

One example method includes generating, by a data backup server agent that is hosted by a backup client computing system, backup data files from data stored at the backup client computing system. The backup data files are written to a temporary folder in a staging location of a backup storage server. A determination is made of if an attempt to move the temporary folder has failed. A failure is indicative that the backup storage server is operating in a retention lock mode. Each of the plurality of backup data files are moved individually from the temporary folder to a final folder in a final location of the backup storage server when it is determined that the attempt to move the temporary folder has failed.

20 Claims, 9 Drawing Sheets

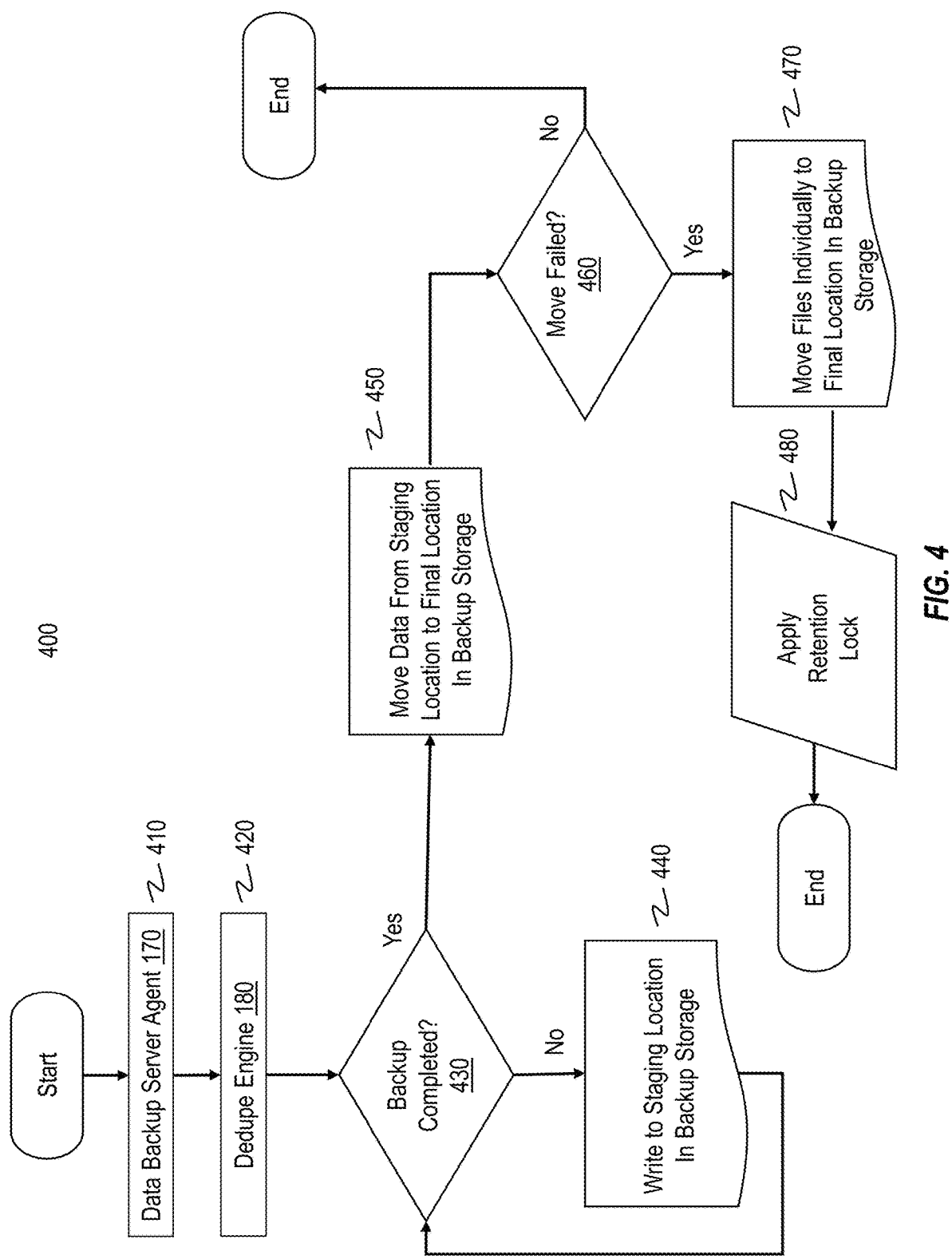

RETENTION LOCK LEVERAGING IN A BACKUP COMPUTING SYSTEM

FIELD OF THE INVENTION

Embodiments of the present invention generally relate to data backup and restore processes. More particularly, at least some embodiments of the invention relate to systems, hardware, software, computer-readable media, and methods for performing the backup and restore processes in a system that includes a backup server operating in retention lock mode.

BACKGROUND

Backup and restore systems typically include various elements such as a backup server, a client backup server, and a storage server. All three of these elements work together to backup data and then to restore the data when there has been an event that requires the backed up data to be restored.

In recent years, users of the backup and restore systems have required that the one or more of the backup server, the client backup server, and the storage server provide enhanced retention measures to ensure that any backed up data is sufficiently secured so that it may not be lost, either through a malicious action or through user error. As these enhanced retention measures have been introduced, it has created problems for the ensuring that the backup server, the client backup server, and the storage server are still able to operate together as one or more of these elements may not be easily configured to implement the enhanced retention measures.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 illustrates a process flow of the embodiment of FIGS. 3A-3C;

DETAILED DESCRIPTION OF SOME EXAMPLE EMBODIMENTS

Figure 1:
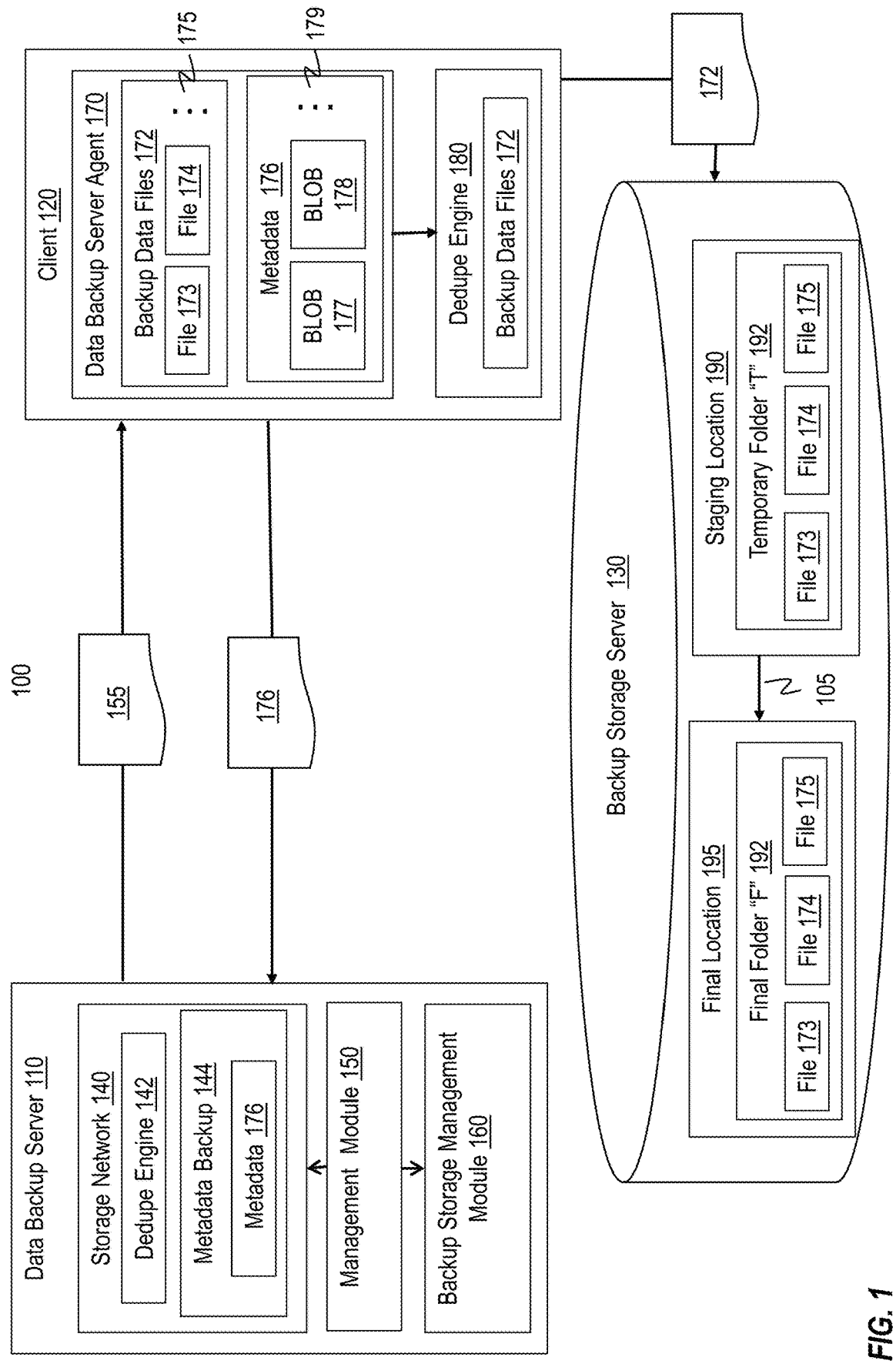
FIG. 1 illustrates an embodiment of backup system according to embodiments disclosed herein.

Embodiments of the present invention generally relate to data backup and restore processes. More particularly, at least some embodiments of the invention relate to systems, hardware, software, computer-readable media, and methods for performing the backup and restore processes in a system that includes a backup server operating in retention lock mode.

One example method includes generating, by a data backup server agent that is hosted by a backup client computing system, backup data files from data stored at the backup client computing system. The backup data files are written to a temporary folder in a staging location of a backup storage server. A determination is made of if an attempt to move the temporary folder has failed. A failure is indicative that the backup storage server is operating in a retention lock mode. Each of the plurality of backup data files are moved individually from the temporary folder to a final folder in a final location of the backup storage server when it is determined that the attempt to move the temporary folder has failed. Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, an embodiment of a backup computing system 100 for performing data backups and the like is denoted generally at 100. The backup computing system 100 includes a data backup server 110, a client 120, and a backup storage server 130. The data backup server 110 may be implemented as a single computing system or it may be distributed across multiple computing systems, which may be physical computing systems and/or virtual computing systems. The data backup server 110 is configured to provide backup storage and backup management capabilities. Accordingly, the data backup server 110 includes a storage network 140 for storing backup data such as metadata backup files and other data backup files. The storage network 140 may include a deduplication ("dedupe") engine 142 that dedupes the data before it is stored on the storage network 140. In addition, the data backup server 110 includes a management module 150 that provides management services for the backup system 100 and also includes an interface for receiving user input. A backup storage management module 160 provides management services to the backup storage server 130 and allows the data server 110 to communicate with the backup storage server 130. The data backup server 110 may include further components that are not illustrated in FIG. 1. In one embodiment, the data backup server 110 may be the Dell-EMC Avamar platform.

The client 120 may be implemented as a backup server that prepares data and its associated metadata that needs to be backed up and then writes the backup data and the metadata to the data backup server 110 and/or backup storage server 130. The client 120 may host a data backup server agent 170, which may be an agent of the data backup server 110. The data backup server agent 170 may be implemented as a plugin that is invoked by the client 120 as needed for performing data backups. The client 120 may also host a dedupe engine 180, which may be an API associated with the backup storage server 130. The dedupe engine 180 may dedupe the backup data. Since the dedupe engine 180 is an API associated with the backup storage server 130, it may also be used by the data backup server agent 170 to write the deduped backup data to the backup storage server 130 and to otherwise interact with the backup storage server 130.

The backup storage server 130 is the target storage for the backup data from the client 120 and thus includes the physical storage where the backup data is stored. The backup storage server 130 may include its own dedupe engine (not illustrated) that can dedupe backup data as needed before the data is stored. The backup storage server 130 may also provide additional storage services as needed. In one embodiment, the backup storage server 130 may be the Dell-EMC DataDomain storage environment.

An embodiment of the operation of the computing system 100 will now be explained in relation to FIG. 1. It will be appreciated that the order that the operations are described is for ease of explanation only. Thus, the operations may take place in a different order as circumstances warrant. The management module 150 generates a backup work order 155 that specifies data that the client 120 should backup. The backup work order 155 is then sent to the client 120. Upon receipt of the backup work order 155, the client 120 may invoke the data backup server agent 170 for use in performing the data backup.

The data backup server agent 170 prepares backup data files 172 that need to be backed up. As illustrated, the backup data files 172 includes various data files for backup. For example, the backup data files 172 includes a backup file 173, a backup file 174, and any number of additional backup files 175 as illustrated by the ellipses.

The data backup server agent 170 also prepares metadata 176 that is associated with all the backup data files 172 and includes information about all the backup data files 172 such as file name, directory information, and other attributes of each backup file. Thus, the metadata 176 will include a metadata Binary Large Object (BLOB) 177 (metadata of backup data file 173), a metadata BLOB 178 (metadata of backup data file 174), and any number of additional metadata BLOBs 179 (metadata of any additional backup data files 175) as illustrated by the ellipses. It will be appreciated that although only a small number of backup files and metadata BLOBs are shown in FIG. 1, this is for ease of illustration only as in typical embodiment there may be millions or even tens of millions of backup files and metadata prepared by the data backup server agent 170.

The data backup server agent 170 provides the backup data files 172 to the dedupe engine 180, which performs a dedupe operation on the backup data files 172 as needed. The data backup server agent 170 then uses an API call from the dedupe engine 180 to send the deduped backup data files 172 to the backup storage server 130. In some embodiments, the data backup server agent 170 provides progress and status information to the data backup server 110.

Upon receipt at the backup storage server 130, the backup data files 173, 174, and 175 are written by the data backup server agent 170 into a temporary folder "T" 192 inside a staging location 190 of the backup storage server 130. It will be noted that in the disclosed embodiments, a one-to-one relationship is shown between the backup data files 173, 174, and 175 of the data files 172 that are generated by the data backup server agent 170 and those that are written to the temporary folder "T" 192. However, this is for ease of illustration only and the one-to-one relationship need not be the case. For example, in some embodiments the number of backup data files generated by the data backup server agent 170 may be much larger than the number of backup data files written to the temporary folder. For instance, there may be 50 million backup data files 172 at the client 120, but only 500K backup data files 172 are written to the temporary folder since the data backup server agent 170 may use packing to pack more than one backup data file from the backup data files 172. The packing results in a lesser number, but larger in size, of backup data files being written to the temporary folder "T" 192. Thus, the embodiments and claims disclosed herein are not limited to any number of backup data files 172 written to the temporary folder "T" 192 or to any relationship between the number of backup data files are generated at the client 120 and the number that are written to the temporary folder "T" 192.

Once all the backup files of the backup data files 172 have been written into the temporary folder "T" 192 inside the staging location 190, the data backup server agent 170 moves the temporary folder "T" 192 to a final folder "F" 196 in a final location 195 of the backup storage server 130 as shown at 105. Accordingly, the final folder "F" 196 is in the final location 195 and will not be changed or modified and will only be read from if a restore operation is ever needed.

The data backup server agent 170 also connects with the storage network 140 and sends the metadata 176 to the storage network 140. The storage network 140 then stores the metadata 176 including the metadata BLOB 177 and the metadata BLOB 178 in a metadata backup 144. Although not illustrated, the additional metadata BLOBs 179 may also be stored in the metadata backup 144. The storage network 140 also creates a backup entry in its accounting system and assigns the backup number to the final folder "F"196 and its associated metadata in the metadata backup 144. The backup entry is then sealed on the storage network 140 and is ready for any future restoration process or other related processes.

Figure 2:
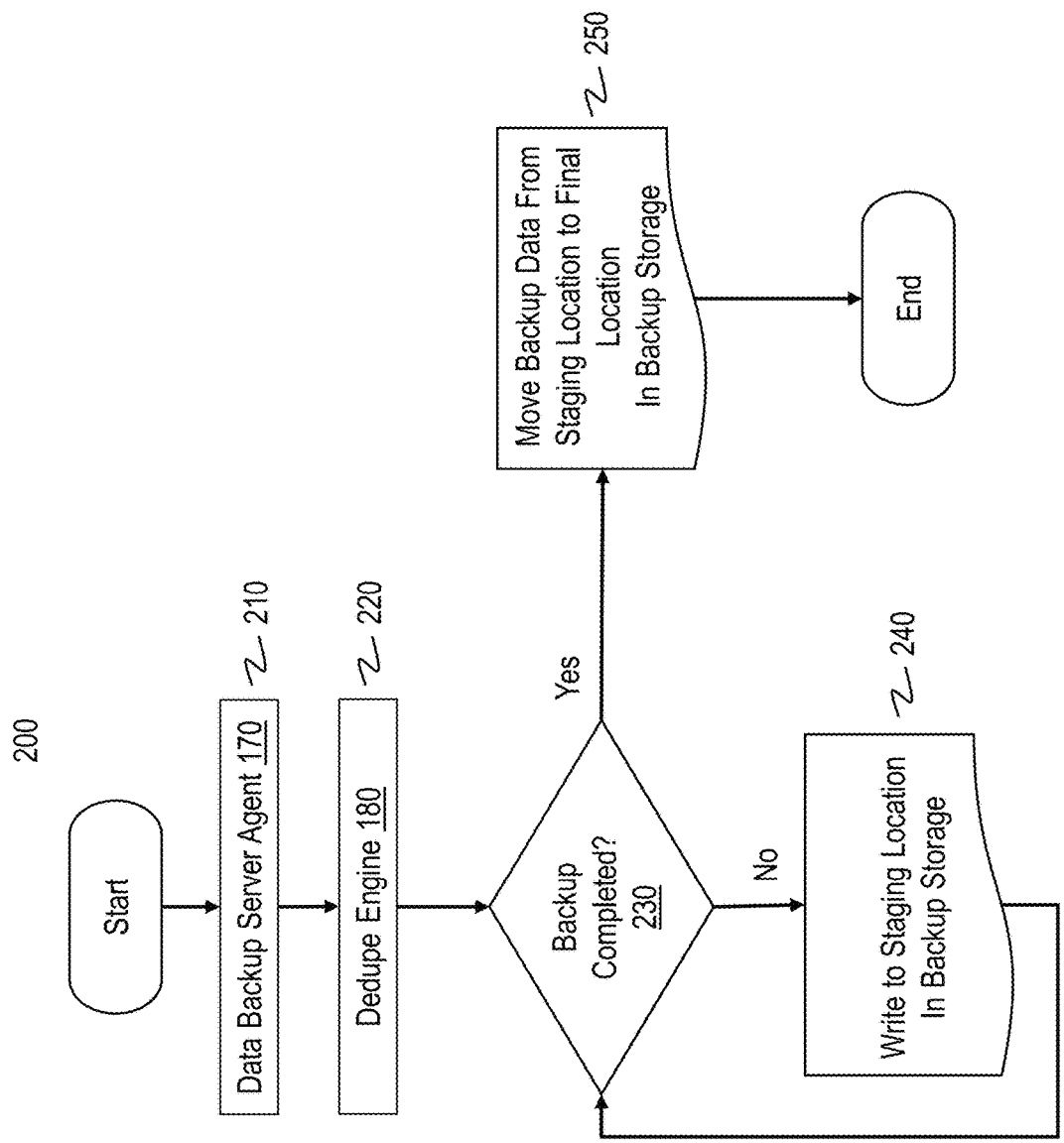
FIG. 2 illustrates a process flow of the embodiment of FIG. 1.

FIG. 2 illustrates a process flow 200 that summarizes the operational flow between the client 120 and the backup storage server 130 of the embodiment of FIG. 1. At step 210, the data backup server agent 170 prepares the files of the backup data files 172. At step 220, the dedupe engine 180 dedupes the files of the backup data files 172.

At decision block 230, a determination is made if the backup is completed. When it is determined in decision block 230 that backup is not completed (No in decision block 230), at step 240 the data backup server agent 170 writes the files of the backup data files 172 in the temporary folder "T" 192 in the staging location 190. This process repeats until all the files of the backup data files 172 have been written into the temporary folder "T" 192. When all the files of the backup data files 172 has been written, it is determined in decision block 230 that backup is completed (Yes in decision block 230). At step 250, the temporary folder "T"192 is moved to the final folder "F" 196 in the final location 195 in the backup storage server 130.

B. Aspects of Some Example Embodiments of the Invention

Figure 3A:
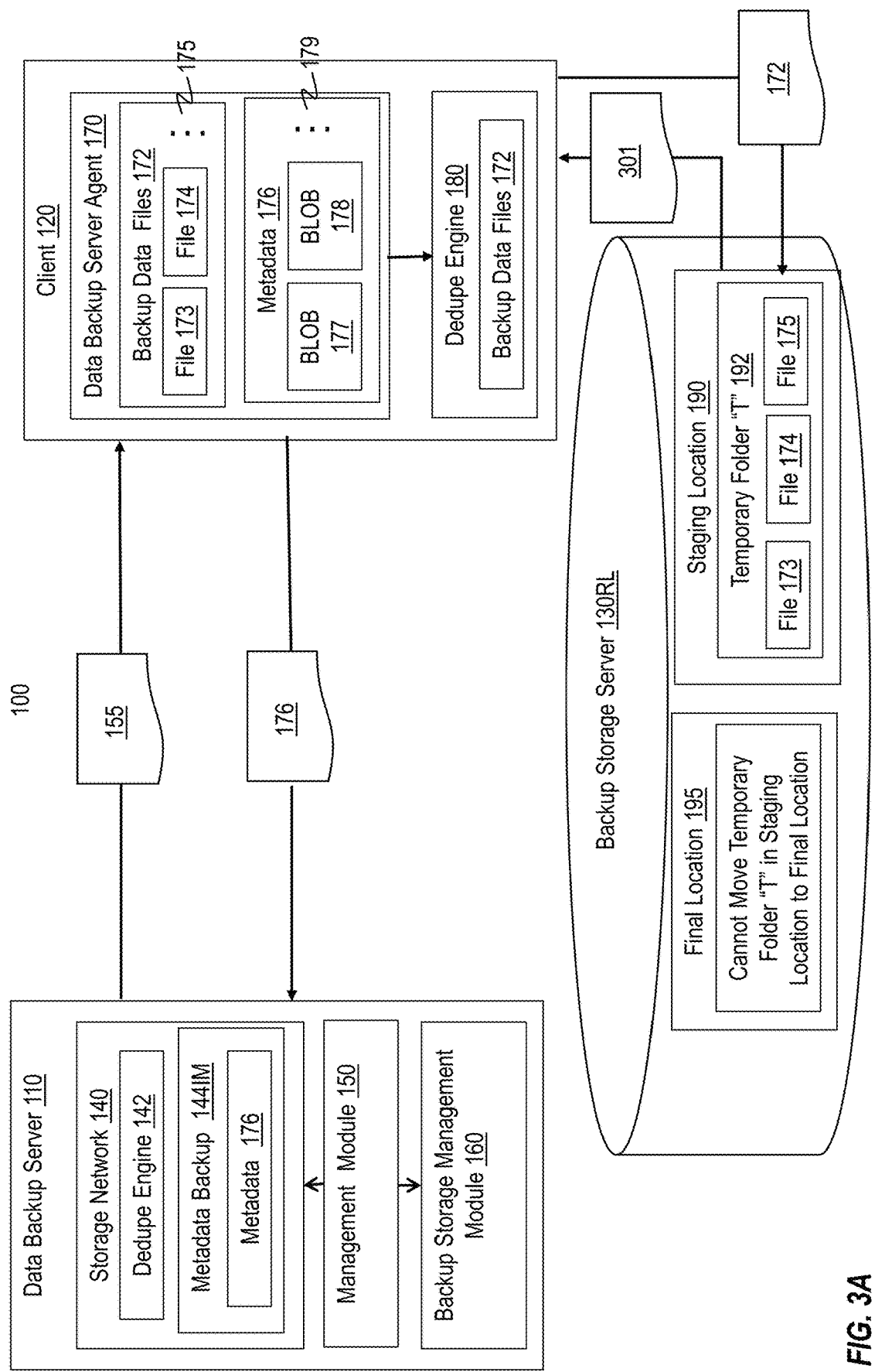
FIGS. 3A-3C illustrate an embodiment of backup system according to embodiments disclosed herein.
Figure 3B:
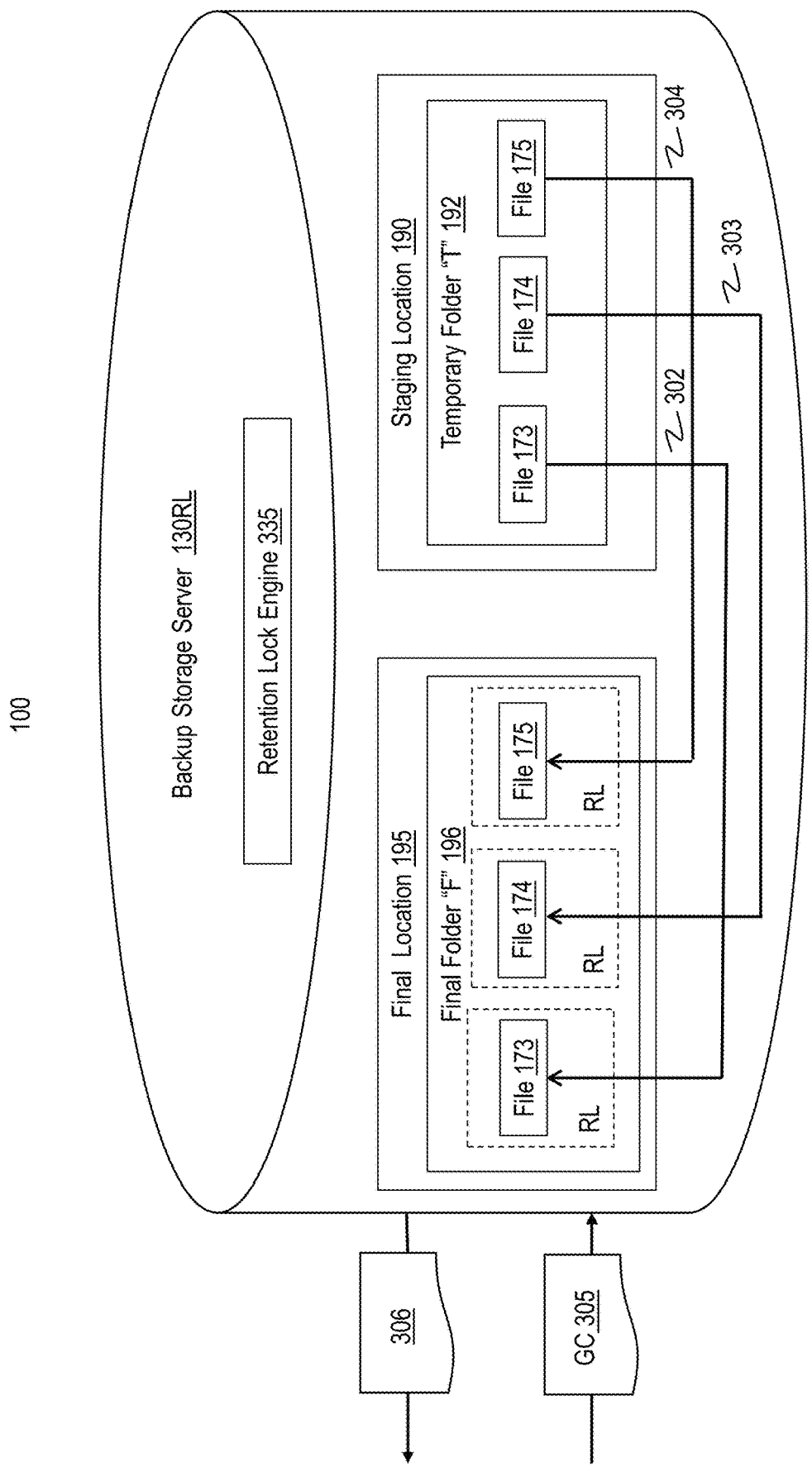
Figure 3C:
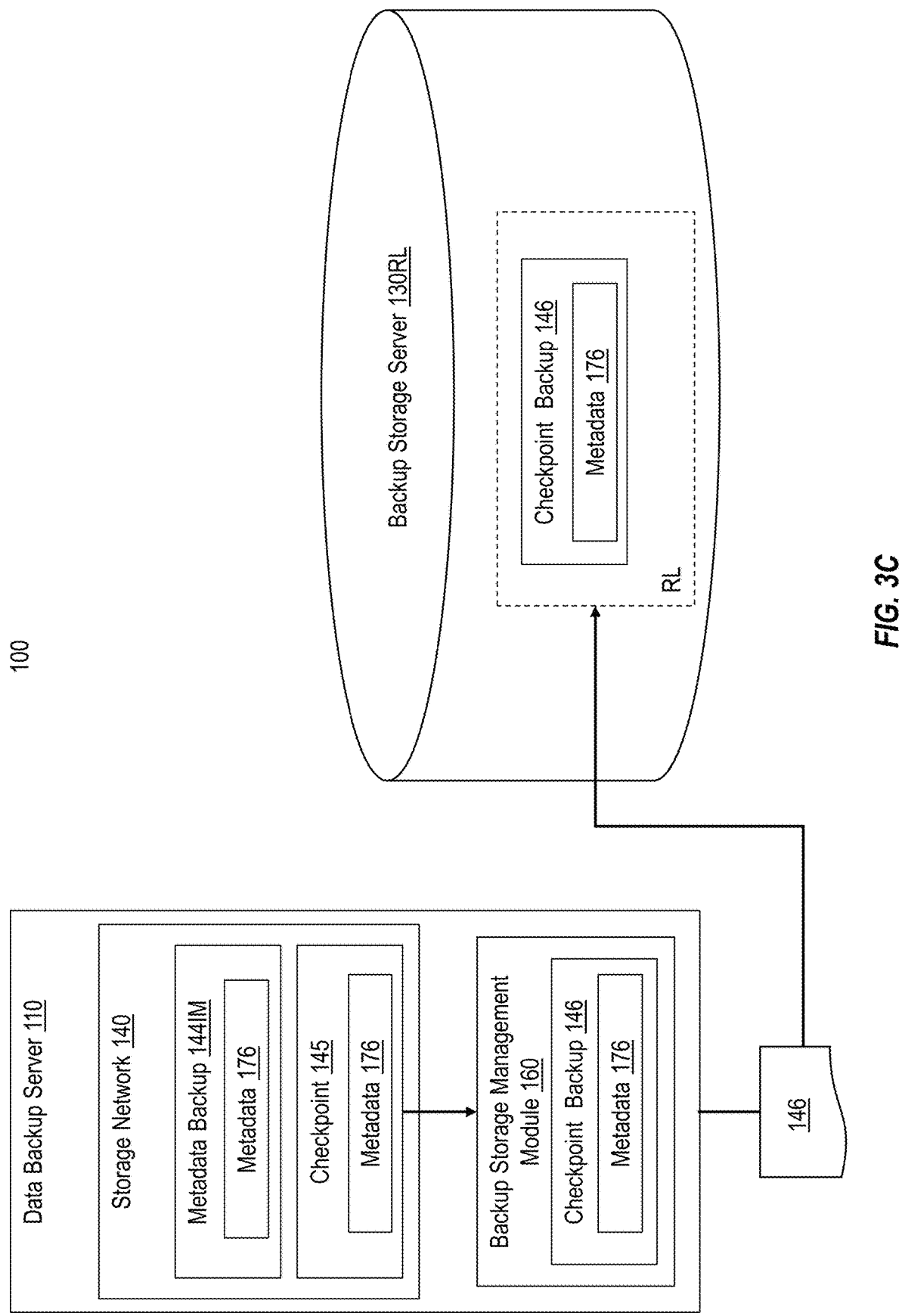

FIGS. 3A-3C illustrate an embodiment of the backup computing system 100 in which the principles of the present invention may be practices. As illustrated, the embodiment of FIGS. 3A-3C, most of the elements are the same as the elements of the embodiment of FIG. 1. Accordingly, like elements need not be explained again and the discussion will focus on the elements of the computing system that are different from the embodiment of FIG. 1.

As illustrated in FIG. 3A, the backup storage server of the embodiment of FIG. 3A is labeled backup storage server 130RL. The RL means that the backup storage server is operating in Retention Lock (RL) mode and thus differs from the backup storage server 130, which is not operating in RL mode. When the backup storage server 130RL is operating in RL mode, it has functionality that can be optionally applied to any backup data that is stored on the backup storage server that prevents the modification, alteration, or deletion of the backup data. Thus, any backup data that has the RL functionality applied to it cannot be modified, altered, or deleted until such time as the retention lock expires. Accordingly, the use of the RL mode is a way to ensure that backup data will not be changed or lost in any way until the expiration of the RL mode. This can be desirable for users who have needs, such as regulatory needs, to ensure that backup data is retained unchanged for a given period of time.

While the use of the backup storage server 130RL may be beneficial to users who need or desire the RL functionality, it also causes unique problems for the backup computing system 100, in particular the client 120. One problem is the that the client 120 may not be aware if the backup storage server it is communication with is operating in the RL mode. That is, the client 120 does not know if it is communicating with a backup storage server 130 that is not in RL mode or with a backup storage server 130RL that is in RL mode. Thus, if the client 120 is communicating with the backup storage server 130RL and then tries to move the folder as described, an error will be generated, and the process of FIG. 2 cannot be completed. That is, the temporary folder "T" 192 cannot be moved to the final location 195, where it will be available for use in a recovery process. This is because a backup storage server 130 that is in the RL mode typically does not allow a folder move since one or more of the files can be retention locked and it would be wrong to move a retention locked filed. An alternative would be to allows a folder move by first checking to see if any of the files are retention locked, but this would be an extremely slow process as there may be a large number of files in a folder. Accordingly, the backup storage server 130 that is in the RL mode may not allow for a move operation on a folder.

One potential solution to this problem is to implement an API call using the dedupe engine 180 to check if the backup storage server is operating in the RL mode. If the status of the backup storage server is known, then alternative operations can be used. However, this also is problematic. For example, there are several existing versions of the dedupe engine 180 that can be implemented on the client 120. Some of the versions, however, may be older versions that lack the functionality to make an API call to check the status of the backup storage server. Thus, this potential solution is not possible for every client 120.

Another problem with this potential solution is that even if such an API call can be made, such an API call incurs the additional processing cost of an extra API call. Thus, there may be users of the client who do not desire to include this processing cost, especially those who may not be interested in utilizing the RL functionality on their backup data.

The principles of the current invention provide for a novel mechanism that allows the computing system 100, in particular the client 120 to complete the process described in FIG. 2 without knowing beforehand the status of the backup storage server. In addition, the novel mechanism does not require any additional API calls, but merely uses the API calls of the process of FIG. 2. Further, the novel mechanism allows the RL functionality to be applied to backup data when the functionality is desired.

The novel mechanism will now be described in relation to FIGS. 3A-3C. It will be appreciated that the order that the operations are described is for ease of explanation only. Thus, the operations may take place in a different order as circumstances warrant. The management module 150 generates a backup work order 155 that specifies data that the client 120 should backup. The backup work order 155 is then sent to the client 120. Upon receipt of the backup work order 155, the client 120 may invoke the data backup server agent 170 for use in performing the data backup.

The data backup server agent 170 prepares backup data files 172 that need to be backed up. As illustrated, the backup data files 172 includes various data files for backup. For example, the backup data files 172 includes a backup file 173, a backup file 174, and any number of additional backup files 175 as illustrated by the ellipses.

The data backup server agent 170 also prepares metadata 176 that is associated with all the backup data files 172 and includes information about all the backup data files 172 such as file name, directory information, and other attributes of each backup file. Thus, the metadata 176 will include a metadata BLOB 177 (metadata of file 173), a metadata BLOB 178 (metadata of file 174), and any number of additional metadata BLOBs 179 (metadata of any additional files 175) as illustrated by the ellipses. It will be appreciated that although only a small number of backup files and metadata BLOBs are shown in FIG. 1, this is for ease of illustration only as in typical embodiment there may be millions or even tens of millions of backup files and metadata prepared by the data backup server agent 170.

The data backup server agent 170 provides the backup data files 172 to the dedupe engine 180, which performs a dedupe operation on the backup data files 172 as needed. The data backup server agent 170 then uses an API call from the dedupe engine 180 to send the deduped backup data files 172 to the backup storage server 130. In some embodiments, the data backup server agent 170 provides progress and status information to the data backup server 110.

Upon receipt at the backup storage server 130, the backup data files 173, 174, and 175 are written by the data backup server agent 170 into a temporary folder "T" 192 inside a staging location 190 of the backup storage server 130.

As described previously in relation to FIGS. 1 and 2, at this point the data backup server agent 170 attempts to rename the temporary folder "T" 192 and to move the folder to the final location 195. However, since in the embodiment of FIG. 3A the backup storage server 130RL is in the RL mode, the rename and move operation fails and an error 301 is generated and returned to the client 120. The data backup server agent 170 intercepts the error 301 and from the error is able to determine that the backup storage server 130RL is in the RL mode. Advantageously, the data backup server agent 170 indirectly learns of the status of the backup storage server 130RL by simply following its normal backup operation, thus not incurring any further processing and performance costs of an additional API call. In other words, the API calls made to the backup storage server 130RL from the client 120 are only those that would be made whether the backup storage server 130RL was in RL mode or not.

The receipt of the error 301 also triggers the data backup server agent 170 to implement the novel mechanism for when the backup storage server 130 is operating in RL mode. This will be described in relation to FIGS. 3B and 4. FIG. 3B illustrates the backup storage server 130RL at the time the data backup server agent 170 implements the novel mechanism. As illustrated, the backup data files 173, 174, and 175 have been written to the temporary folder "T" 192 in the staging location 190 prior to the data backup server agent 170 attempting to rename and move the folder.

Upon determining from the error 301 that the backup storage server 130RL is in the RL mode, the data backup server agent 170 moves each of the backup data files from the temporary folder "T" 192 in the staging location 190 to a new final folder "F" 196 in the final location 195 of the backup storage server 130RL. For example, the data backup server agent 170 first moves the backup data file 173 as indicated at 302, then moves the backup data file 174 as indicated at 303, and finally moves the backup data file 175 as indicated by 304.

Once the process of moving each of the backup data files individually is completed, the data backup server agent 170 uses a retention lock engine 335 of the backup storage server 130RL and applies the retention lock to each of the files individually. For example, the data backup server agent 170 first applies the retention lock to the backup data file 173, then applies the retention lock to the backup data file 174, and finally applies the retention lock to the backup data file 175. The application of the retention lock is shown by the dashed lines marked RL around each the backup data files.

In some embodiments, the process of individually retention locking each backup data file will fail for some reason during the process. For example, the backup data file 173 may have been individually locked, but then the process failed for the backup data file 174. In such case, the data backup server agent 170 will attempt to garbage collect those backup data files that have not been locked as shown at 305. Thus, the backup data files 174 and 175 will be garbage collected. It be appreciated that the backup data file 173 that was retention locked cannot be garbage collected since it is locked and it will remain stored on the backup storage server 130RL until such time as the RL expires, at which time it can be garbage collected if needed.

In addition to garbage collecting, the data backup server agent 170 will generate an error 306 that will notify of the failed RL process. This will cause the system to restart the backup process since a completed RL process is needed before the metadata 176 can be stored.

The data backup server agent 170 also connects with the storage network 140 and sends the metadata 176 to the storage network 140. The storage network 140 then stores the metadata 176 in a metadata backup 144IM, which will be described in more detail to follow. In addition, the storage network 140 creates a backup entry in its accounting system and assigns the backup number to the final folder "F"196 and its associated metadata in the metadata backup 144IM. The backup is then sealed on the storage network 140 and is ready for any future restoration process or other related processes.

FIG. 4 illustrates a process flow 400 that summarizes the operational flow between the client 120 and the backup storage server 130RL of the embodiment of FIGS. 3A-3B. At step 410, the data backup server agent 170 prepares the files of the backup data files 172. At step 420, the dedupe engine 180 dedupes the files of the backup data files 172.

At decision block 430, a determination is made if the backup is completed. When it is determined in decision block 430 that backup is not completed (No in decision block 430), at step 440 the data backup server agent 170 writes the files of the backup data files 172 in the temporary folder "T" 192 in the staging location 190. This process repeats until all the files of the backup data files 172 have been written into the temporary folder "T" 192. When all the files of the backup data files 172 have been written, it is determined in decision block 430 that backup is completed (Yes in decision block 430). At step 450, the data backup server agent 170 attempts to move the temporary folder "T"192 to the final folder "F" 196 in the final location 195.

At decision block 460, a determination is made if the moving of the temporary folder "T" 192 failed or not. If the moving of the temporary folder "T" 192 did not fail (No in decision block 460), then the backup storage server is not in the RL mode and the temporary folder "T"192 was successfully moved to the final folder "F" 196 in step 450 and the process flow ends.

If moving the temporary folder "T" 192 did fail (Yes in decision block 460), then the backup storage server is in the RL mode. At step 470, the data backup server agent 170 moves each of the files of the backup data files 172 individually to the final folder "F" 196 in the final location 195. At step 480, the retention lock is applied to each of the backup data files 172 individually and the process flow ends.

As discussed previously, the metadata 176 is associated with the backup data files 172 and includes information about the backup data files 172 such as file name, directory information, and other attributes of each backup file. Since the backup data files stored on the backup storage server do not include any of this information, any loss of the metadata 176 would render the files of the backup data files 172 stored on the backup storage server 130 useless. That is, the data would exist on the backup storage server, but would not be able to be retrieved. Thus, it is important to protect the metadata 176 since users can use metadata to retrieve the backup data files 172 and in turn restore the data in the event of data loss to a disaster or intentional destruction of the data.

One partial protection for the metadata 176 is to implement what is known as immutable mode on the storage network 140 of the data backup server 110. Once immutable mode is enabled, a user is prohibited from modifying the metadata backup 144. Thus, some protection is provided. The embodiment in FIG. 3A is shown as having implemented immutable mode for the metadata backup, thus the metadata backup is labeled as metadata backup 144IM in FIG. 3A.

Although the metadata in the metadata backup 144IM cannot be modified, it is still possible for a "root" user to delete the metadata in the metadata backup 144IM. For example, the "root" user could simply delete the entire metadata in the metadata backup 144IM or could fast forward a system clock and expire the metadata. In either case, the metadata would be lost, and the backup data files 172 would no longer be retrievable.

Accordingly, it is desirable to backup the metadata to the backup storage server 130RL and then to retention lock the metadata. The principles of the current invention provide for this to occur. As shown in FIG. 3C, a portion of the computing system 100 is shown. In FIG. 3C, the metadata backup 144IM has had the immutable mode implemented. However, the principles of the present invention would also apply to embodiments where the immutable mode is not implemented.

The storage network 140 generates a periodic checkpoint 145 on the metadata in the metadata backup 144IM. The checkpoint 145 is a point-in-time snapshot of the metadata 176. Although the metadata 175 has been described as coming from only the client 120, this has been for ease of explanation. In operation, the metadata 176 may be generated by thousands of clients 120 and over a long period of time such as days or weeks. Thus, as illustrated the checkpoint includes the metadata 176. Once the storage network 140 has begun, the control module 150 instructs the backup storage management module 160 to begin a checkpoint backup 146 that mimics the contents of the checkpoint 145. Thus, as illustrated the checkpoint backup 146 includes the metadata 176.

Once the checkpoint backup 146 is generated, the backup storage management module 160 provides the checkpoint backup 146 to the backup storage server 130RL. In some embodiments, the backup storage management module 160 checks to see if a checkpoint backup 146 is already stored on the backup storage server 130RL. If so, then the backup storage management module 160 adds a timestamp to the checkpoint backup 146 so that the most recent checkpoint backup 146 can be known. Once the checkpoint backup 146 is stored on the backup storage server 130RL, a retention lock can be applied to the checkpoint backup 146 as illustrated by the dashed lines labeled as RL. This ensures that the metadata cannot be deleted or otherwise lost as they cannot be deleted from the backup storage server 130RL once retention locked and so can be restored for use in restoring the backup data files 172 as needed.

Figure 5:
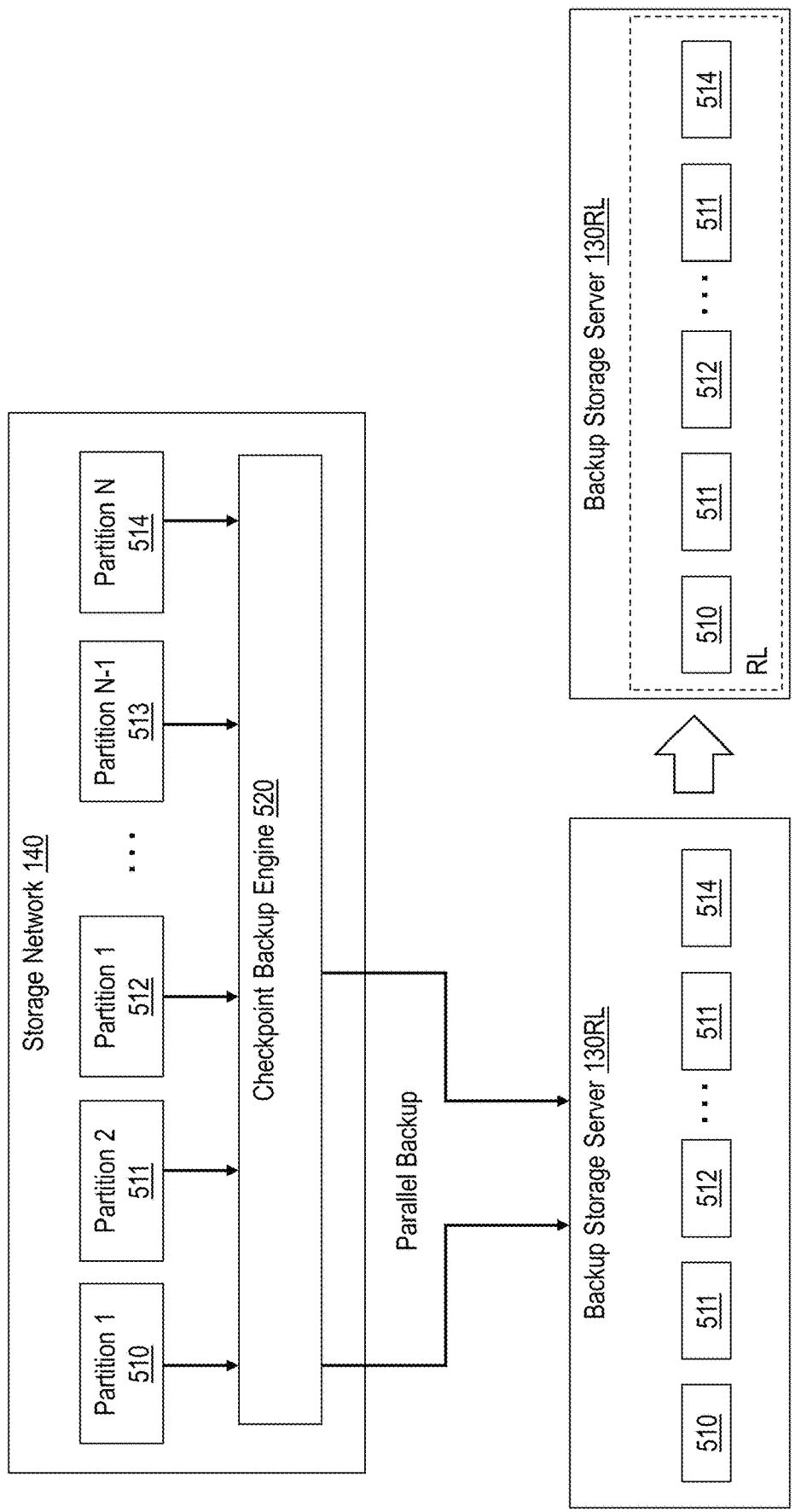
FIG. 5 illustrates an embodiment of writing metadata to a backup storage server according to embodiments disclosed herein.

FIG. 5 illustrates an embodiment of retention locking the metadata stored in the storage network 140. In the embodiment, the metadata 176 is stored as various disk partitions on different disks of the storage network 140. For example, there is a partition 1 510, a partition 2, 511, a partition 3 512, a partition N−1 513, and a partition N 514. Each of the partitions is fed to a checkpoint backup engine 520 that generates the checkpoint backup 146. As discussed above, the metadata 176 stored on the various disk partitions may be generated by thousands of clients 120 and over a long period of time such as days or weeks.

As shown in the figure, the partitions of the checkpoint backup are backed up and sent to the backup storage server 130RL in a parallel fashion, to thus maximize on the communication resources needed. At the backup storage server 130RL, each partition is written to the storage as it is received from the backup storage management module 160. However, it is only when all the partitions of the checkpoint backup are written to the backup storage server 130RL that the retention lock is applied to all partitions as illustrated by the dashed lined labeled RL. Thus, the entire checkpoint backup needs to be received and written to the storage before the retention lock is applied.

C. Example Methods

Figure 6:
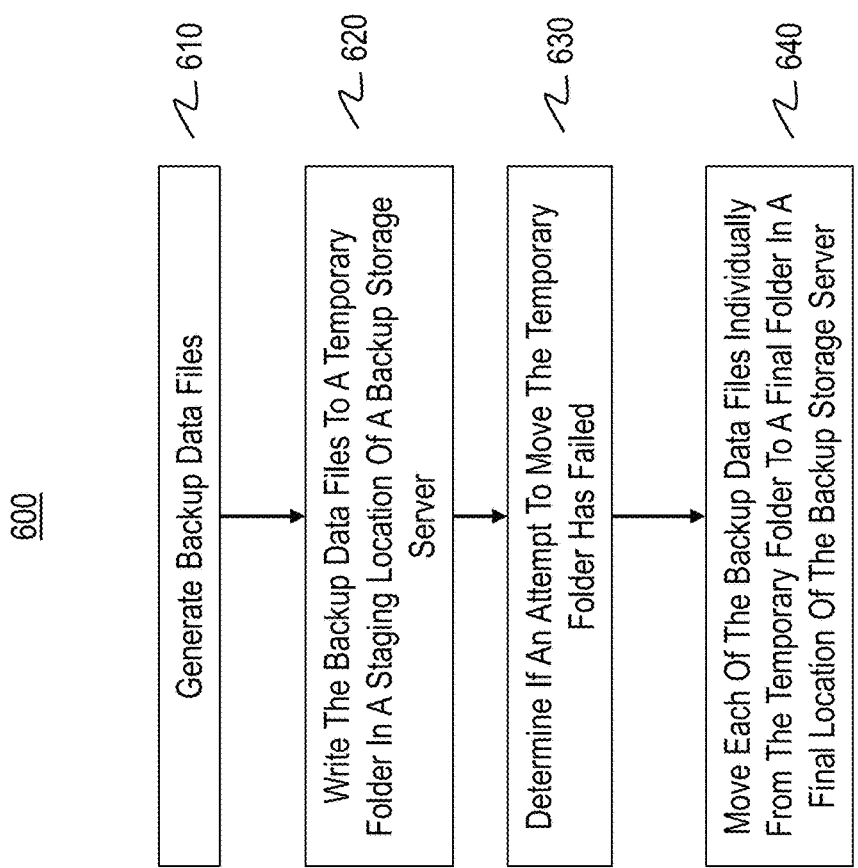
FIG. 6 illustrates a flowchart of an example method for determining if a backup storage server is operating in retention lock mode.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 for determining if a backup storage server is operating in retention lock mode is disclosed. The method 600 will be described in relation to one or more of the figures previously described, although the method 600 is not limited to any particular embodiment.

The method 600 includes generating by a data backup server agent that is hosted by a backup client computing system a plurality of backup data files from data stored at the backup client computing system (610). For example, as previously described the data backup server agent 170 generates that backup data files 172 from the data stored on the client 120.

The method 600 includes writing the plurality of backup data files to a temporary folder in a staging location of a backup storage server (620). For example, the data backup server agent 170 writes the backup data files 172 to the temporary folder "T" 192 in the staging location 190 of the backup storage server 130RL.

The method 600 includes determining if an attempt to move the temporary folder has failed, wherein a failure is indicative that the backup storage server is operating in a retention lock mode (630). For example, as previously described a determination is made if the temporary folder has moved as discussed in FIG. 4. A failure to move indicates that the backup storage server 130RL is operating in retention lock mode.

The method 600 includes moving each of the plurality of backup data files individually from the temporary folder to a final folder in a final location of the backup storage server when it is determined that the attempt to move the temporary folder has failed (640). For example, as previously described data backup server agent 170 individually moves each of the backup data files to the final folder "F" 196 in the manner previously described in relation to FIG. 3B.

D. Further Example Embodiments

Following are some further example embodiments of the invention. These are presented only by way of example and are not intended to limit the scope of the invention in any way.

Embodiment 1. A method, comprising: generating by a data backup server agent that is hosted by a backup client computing system a plurality of backup data files from data stored at the backup client computing system; writing the plurality of backup data files to a temporary folder in a staging location of a backup storage server; determining if an attempt to move the temporary folder has failed, wherein a failure is indicative that the backup storage server is operating in a retention lock mode; and moving each of the plurality of backup data files individually from the temporary folder to a final folder in a final location of the backup storage server when it is determined that the attempt to move the temporary folder has failed.

Embodiment 2. The method of embodiment 1, further comprising: applying a retention lock on each of the plurality of backup data files individually after the plurality of backup data files have been moved to the new folder.

Embodiment 3. The method of embodiment 2, wherein retention locking each of the plurality of backup data files prevents the plurality of backup data files from being altered or removed from the backup storage server.

Embodiment 4. The method of embodiment 2, further comprising: determining that the retention lock process failed before all of the plurality of backup data files have had the retention lock applied to them; in response to the determination, performing a garbage collection process to remove those backup files that did not have the retention lock applied to them; and generating an error that causes the data backup server agent to restart generating the plurality of backup data files.

Embodiment 5. The method of embodiments 1-4, wherein determining that the attempt to move the temporary folder has not failed means that the temporary folder has been moved to the final location in the backup storage server.

Embodiment 6. The method of embodiments 1-5, further comprising: generating by a data backup server agent metadata associated with the plurality of backup data files; writing the metadata in a backup storage at a data backup server who controls the data backup server agent; generating a point-in-time backup of the metadata; generating a backup of the point-in-time backup of the metadata; writing the backup of the point-in-time backup to the data storage server; and applying a retention lock to the metadata included in the backup of the point-in-time backup.

Embodiment 7. The method of embodiment 6, wherein the retention lock is not applied to the metadata until all of the metadata has been written to the data storage server.

Embodiment 8. The method of embodiment 6, wherein the metadata included in the backup of the point-in-time backup is written to the data storage server in a parallel manner.

Embodiment 9. The method of embodiments 1-8, wherein the plurality of backup data files are subjected to a deduplication process before being written to the temporary folder.

Embodiment 10. The method of embodiments 1-9, wherein the attempt to move the temporary folder is not performed unit after all of the plurality of backup data files have been written to the temporary folder.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

Finally, because the principles described herein may be performed in the context of a computing system some introductory discussion of a computing system will be described with respect to FIG. 7. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
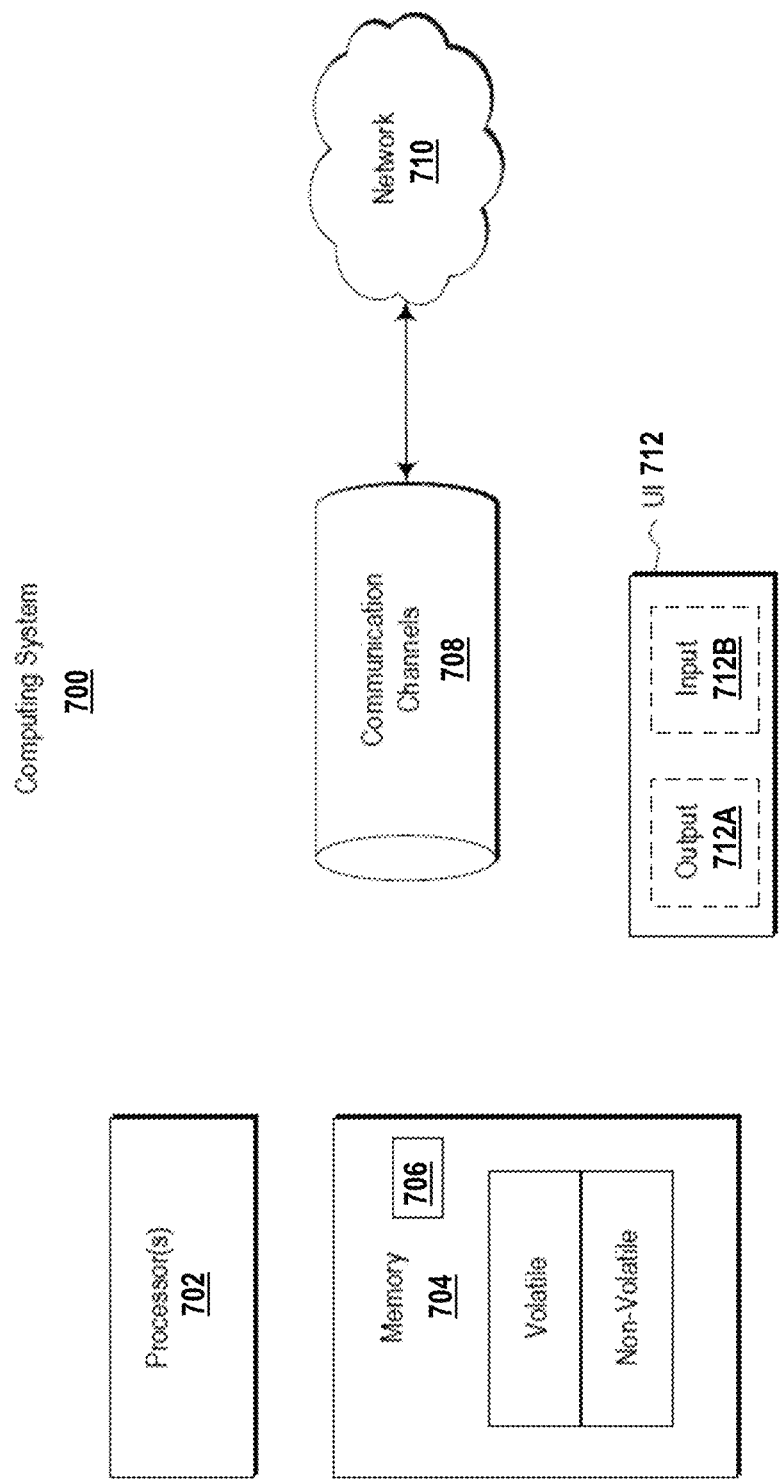
FIG. 7 illustrates an example computing system in which the embodiment described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product.

An example of such an operation involves the manipulation of data. If such acts are implemented exclusively or near-exclusively in hardware, such as within an FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    performing a backup operation by writing backup data files to a temporary folder in a staging location of a backup storage server;
    moving the temporary folder to a final location in a backup storage;
    determining that the backup storage server is operating in a retention lock mode if attempting to move the temporary folder to the final location fails; and
    moving each of the backup data files individually from the temporary folder to a final folder in the final location of the backup storage server.

2. The method of claim 1, further comprising:
    applying a retention lock on each of the backup data files individually after the plurality of backup data files have been moved to the final folder.

3. The method of claim 2, further comprising generating the backup data files during the backup operation, wherein retention locking each of the backup data files prevents the backup data files from being altered or removed from the backup storage server, wherein the retention locked backup files are read only, wherein the attempt to move the temporary folder is not performed unit after all of the backup data files have been written to the temporary folder.

4. The method of claim 2, further comprising:
    determining that applying the retention lock failed before all of the backup data files have had the retention lock applied to them, wherein determining that the attempt to move the temporary folder has not failed means that the temporary folder has been moved to the final location in the backup storage server; and
    in response to the determination that applying the retention lock failed:
        performing a garbage collection process to remove those backup files that did not have the retention lock applied to them; and
        generating an error that causes a data backup server agent to restart generating the backup data files.

5. The method of claim 1, further comprising:
    generating metadata associated with the backup data files;
    writing the metadata in a backup storage at a data backup server who controls the data backup server agent;
    generating a point-in-time backup of the metadata;
    generating a backup of the point-in-time backup of the metadata;
    writing the backup of the point-in-time backup to the data storage server; and
    applying a retention lock to the metadata included in the backup of the point-in-time backup.

6. The method of claim 5, wherein the retention lock is not applied to the metadata until all of the metadata has been written to the data storage server.

7. The method of claim 6, wherein the metadata included in the backup of the point-in-time backup is written to the data storage server in a parallel manner.

8. The method of claim 1, further comprising packing the backup data files to reduce a number of the backup data files and/or increase a size of the backup data files.

9. The method of claim 2, further comprising performing a restore operation from at least some of the retention locked backup data files.

10. The method of claim 9, wherein the restore operation includes restoring from metadata stored in a point-in-time retention locked metadata backup.

11. A non-transitory storage medium having stored therein instructions that are executable by one or more hardware processors to perform operations comprising:
    performing a backup operation by writing backup data files to a temporary folder in a staging location of a backup storage server;
    moving the temporary folder to a final location in a backup storage;
    determining that the backup storage server is operating in a retention lock mode if attempting to move the temporary folder to the final location fails; and
    moving each of the backup data files individually from the temporary folder to a final folder in the final location of the backup storage server.

12. The non-transitory storage medium of claim 11, further comprising:
    applying a retention lock on each of the backup data files individually after the plurality of backup data files have been moved to the final folder.

13. The non-transitory storage medium of claim 12, further comprising generating the backup data files during the backup operation, wherein retention locking each of the backup data files prevents the backup data files from being altered or removed from the backup storage server, wherein the retention locked backup files are read only, wherein the attempt to move the temporary folder is not performed unit after all of the backup data files have been written to the temporary folder.

14. The non-transitory storage medium of claim 12, further comprising:
    determining that applying the retention lock failed before all of the backup data files have had the retention lock applied to them, wherein determining that the attempt to move the temporary folder has not failed means that the temporary folder has been moved to the final location in the backup storage server; and
    in response to the determination that applying the retention lock failed:
        performing a garbage collection process to remove those backup files that did not have the retention lock applied to them; and generating an error that causes a data backup server agent to restart generating the backup data files.

15. The non-transitory storage medium of claim 11, further comprising:
generating metadata associated with the backup data files;
writing the metadata in a backup storage at a data backup server who controls the data backup server agent;
generating a point-in-time backup of the metadata;
generating a backup of the point-in-time backup of the metadata;
writing the backup of the point-in-time backup to the data storage server; and
applying a retention lock to the metadata included in the backup of the point-in-time backup.

16. The non-transitory storage medium of claim 15, wherein the retention lock is not applied to the metadata until all of the metadata has been written to the data storage server.

17. The non-transitory storage medium of claim 16, wherein the metadata included in the backup of the point-in-time backup is written to the data storage server in a parallel manner.

18. The non-transitory storage medium of claim 11, further comprising packing the backup data files to reduce a number of the backup data files and/or increase a size of the backup data files.

19. The non-transitory storage medium of claim 12, further comprising performing a restore operation from at least some of the retention locked backup data files.

20. The non-transitory storage medium of claim 19, wherein the restore operation includes restoring from metadata stored in a point-in-time retention locked metadata backup.

* * * * *

UNITED STATES PATENT AND TRADEMARK OFFICE
CERTIFICATE OF CORRECTION

PATENT NO. : 12,399,790 B2
APPLICATION NO. : 18/736765
DATED : August 26, 2025
INVENTOR(S) : Salil Dangi et al.

It is certified that error appears in the above-identified patent and that said Letters Patent is hereby corrected as shown below:

In the Specification

Column 7
Line 36, change "An alternative would be to allows a folder" to – An alternative would be to allow a folder –

Signed and Sealed this
Sixteenth Day of December, 2025

John A. Squires
*Director of the United States Patent and Trademark Office*